United States Patent

Brooks, Sr. et al.

[11] Patent Number: 5,377,789
[45] Date of Patent: Jan. 3, 1995

[54] SNAP-IN PARK BRAKE CABLE

[75] Inventors: Frank W. Brooks, Sr., Dayton; Gerald R. Spinks, Kettering, both of Ohio

[73] Assignee: General Motors Corporation, Detroit, Mich.

[21] Appl. No.: 29,836

[22] Filed: Mar. 11, 1993

[51] Int. Cl.⁶ ............................................. F16D 65/22
[52] U.S. Cl. ........................... 188/20; 188/106 A
[58] Field of Search ............. 188/2 D, 78, 79, 106 A, 188/325; 267/179, 180; 74/500.5, 502.4–502.6

[56] References Cited

U.S. PATENT DOCUMENTS

| | | | |
|---|---|---|---|
| 3,064,767 | 11/1962 | Wieger | 188/78 |
| 4,753,325 | 6/1988 | Jaksic | 188/2 D |
| 4,872,533 | 10/1989 | Boyer et al. | 188/2 D |
| 4,886,134 | 12/1989 | Yamamoto | 188/2 D |
| 4,886,146 | 12/1989 | Copp | 188/2 D |
| 4,930,605 | 6/1990 | Boyer et al. | 188/2 D |
| 4,932,503 | 6/1990 | Yamamoto | 188/2 D |
| 4,955,458 | 9/1990 | Shellhause | 74/502.6 X |
| 4,974,708 | 12/1990 | Maligne | 188/2 D X |
| 5,002,159 | 3/1991 | Brix et al. | 188/2 D |
| 5,137,120 | 8/1992 | Barbosa | 74/502.6 X |

Primary Examiner—Robert J. Oberleitner
Assistant Examiner—Alfred Muratori
Attorney, Agent, or Firm—A. Michael Tucker

[57] ABSTRACT

This invention relates to a cable actuated parking brake mechanism for a drum brake. A lever and an associated lever return spring are arranged to accommodate blind assembly of the cable to the lever. The spring guides the cable from an opening in the backing plate to the lever. The spring cooperates with the lever to indicate to an assembler that the cable is fully inserted as well as aids in directing a cable button to an engagement surface.

4 Claims, 2 Drawing Sheets

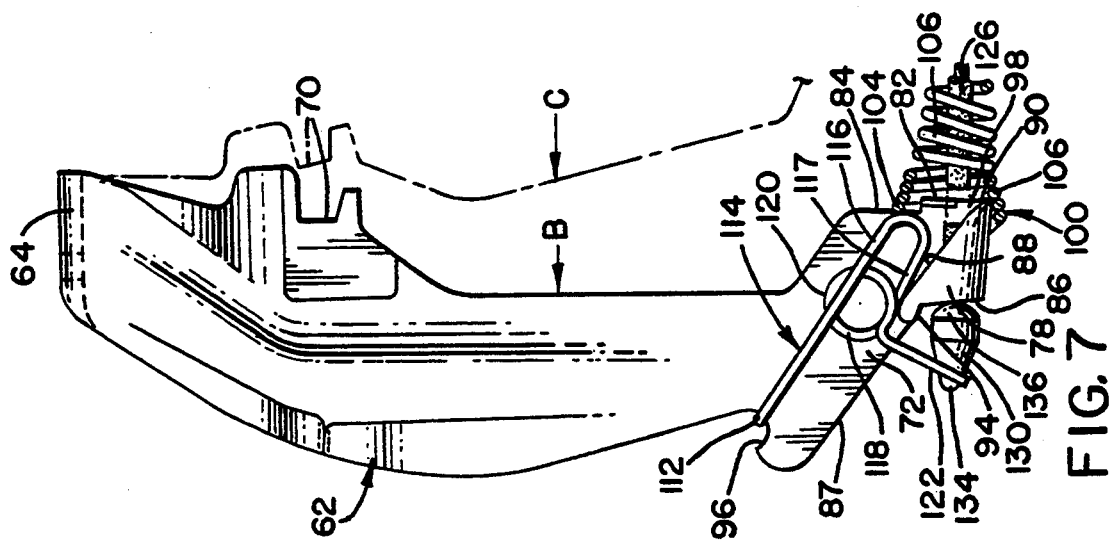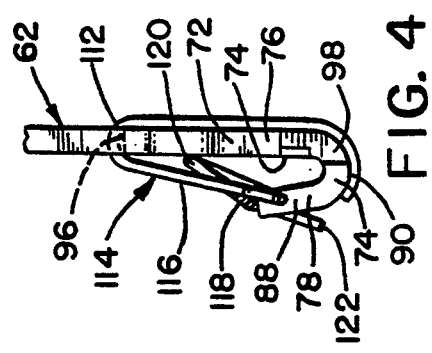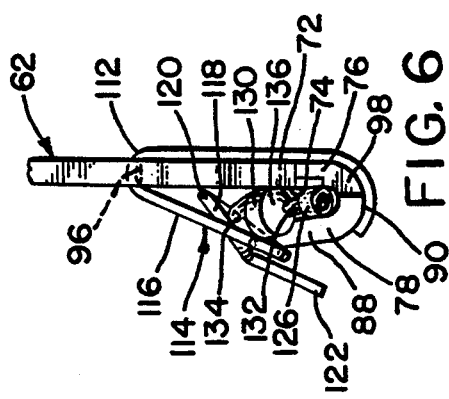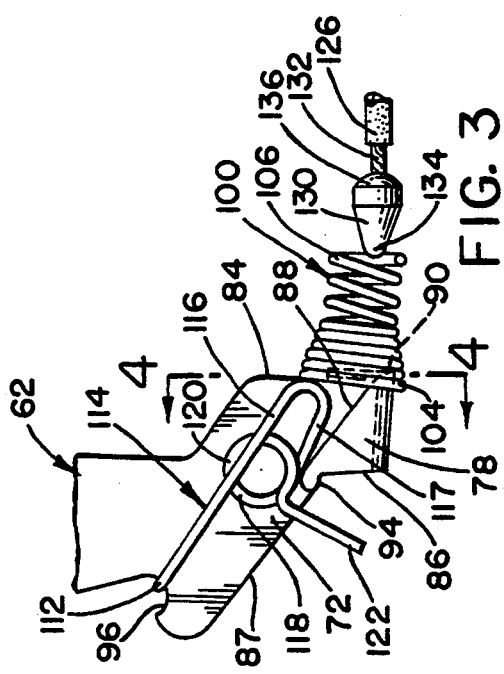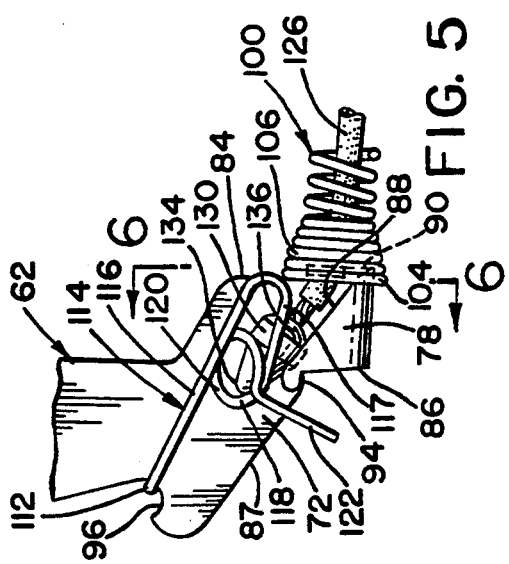

SNAP-IN PARK BRAKE CABLE

TECHNICAL FIELD

This invention relates to blind assembly of a cable to an enclosed actuating lever. More specifically, this invention relates to the blind assembly of a parking brake cable to a parking brake actuating lever inside a brake drum assembly.

BACKGROUND OF THE INVENTION

Typical drum brake parking actuating mechanisms used on automobiles for many years (and still being used) have required that a parking brake cable of a parking brake assembly be inserted by an assembler through a backing plate opening and positioned in approximate relation to an engagement point or engagement surface of a parking brake actuating lever. The lever is pivotally mounted on one of the brake shoe assemblies. The assembler has to maneuver the end of the parking brake cable and/or the parking brake actuating lever to make the connection. This therefore requires that such an assembly be done with the brake's drum being off for the remainder of the brake assembly so that visual and manipulative capabilities are present to complete the assembly. A typical example of such a connection requiring this type of assembly is disclosed in U.S. Pat. No. 3,064,767 entitled "Brake Actuator" and issued Nov. 20, 1962.

In response to the difficulty and inconvenience of so assembling the cable to the lever, methods of doing blind assembly have been developed wherein the cable is assembled to the lever with the drum in place. A common method of blind assembly is to use a return spring for the parking brake actuating lever to guide the cable from the opening in the backing plate to the engagement surface of the parking brake actuating lever. This is shown in U.S. Pat. No. 4,886,146 which is assigned to the assignee of the present invention.

A first end of the cable has a button on it of substantially larger diameter than the cable. The first end of the cable is inserted by the assembler through the opening in the backing plate. The first end enters the return spring which is aligned with the opening in the backing plate. The spring guides the button to the engagement surface on the lever. The assembler must estimate when the cable has been fully inserted, then pull outwardly on the cable to confirm engagement of the cable with the lever.

SUMMARY OF THE INVENTION

The return spring has been modified to wrap around the lever, retaining the spring to the lever and providing a restraining section which resists insertion of the button and traps the cable. The resistance can be overcome by increasing the insertion load on the cable to a magnitude where the restraining section is pushed out of the way by the button. When the button moves past the restraining section, the insertion load drops off rapidly to indicate to the assembler that the cable is fully inserted. This build up and drop off in load is perceived by the assembler as a snapping action. After the button has passed the restraining section, the restraining section, together with the lever, trap the cable, aiding in directing the button to the engagement surface as the cable is tensioned.

It is an object of this invention to provide a parking brake assembly facilitating blind assembly of a cable to a parking brake actuating lever by positively indicating complete insertion of the cable and by directing a button on the end of the cable to engage an engagement surface of the lever as the cable is tensioned.

It is also an object of this invention to provide an improved blind cable assembly having an enclosed mechanism, a lever arranged to actuate the enclosed mechanism, a cable having a button disposed on one end adapted to engage the lever, a plate covering a part of the enclosed mechanism and having an opening through which the button and cable are inserted, a lever return spring disposed between the lever and the plate serving as a guide for the button and cable from the opening in the plate to the lever, and indicating and directing means both for indicating complete insertion of the cable by a gradual increase in cable insertion load followed by a sudden decrease in cable insertion load and for directing the inserted button to an engagement surface of the lever as the cable is tensioned.

These and other objects and advantages will be more apparent from the following description and drawings.

DESCRIPTION OF THE DRAWINGS

FIG. 3 shows a lower end portion of a parking brake lever and a spring in the direction of Arrows 7 of FIG. 2 with a button about to enter the first end of the coil.

FIG. 4 shows the lower end portion of the parking brake lever and the spring of FIG. 3 from the direction of Arrows 4.

FIG. 5 shows the lower end portion of the parking brake lever and the spring in the direction of Arrows 7 of FIG. 2, with the button approaching the end of the ramp surface.

FIG. 6 shows the lower end portion of the parking brake and the spring of FIG. 5 from the direction of Arrows 6.

FIG. 7 shows the parking brake lever and the spring and the parking brake cable from the direction of Arrows 7 of FIG. 2 with the parking brake cable installed.

DESCRIPTION OF THE PREFERRED EMBODIMENT

Figure 1:
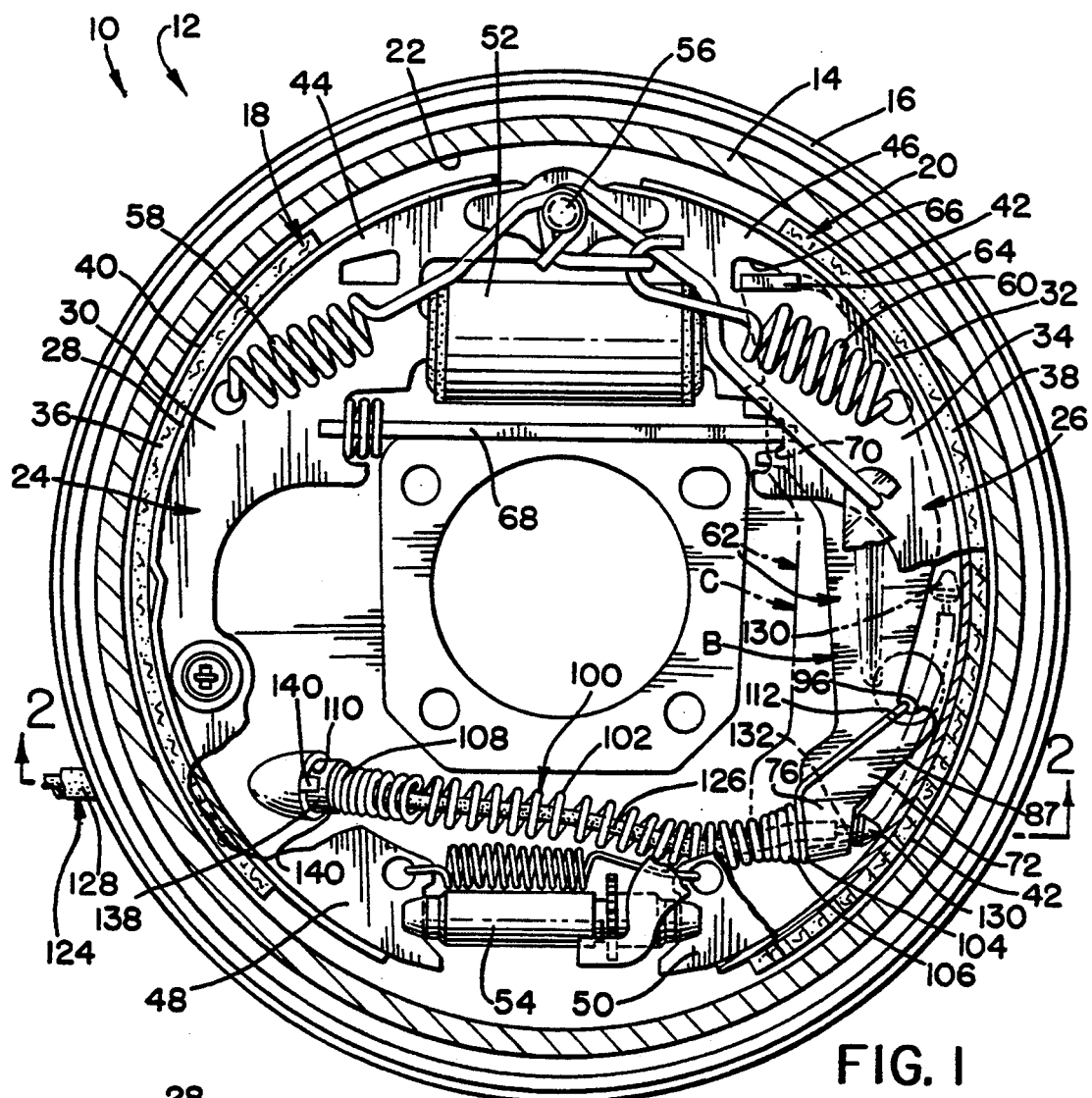
FIG. 1 shows a side view of a drum brake mechanism as it would be viewed from the outboard direction.

FIG. 1 shows a drum parking brake mechanism 10 integral with a drum service brake mechanism 12. The parking and service brake mechanisms 10 and 12 are enclosed by a drum 14 and a backing plate 16.

The backing plate 16 is adapted to be fixed to a nonrotating element (not shown) such as a flange on an end of an axle tube. First and second brake shoe assemblies 18 and 20 are mounted to the backing plate 16 for movement into and out of engagement with a drum friction surface 22 for brake actuation and release.

The shoe assemblies 18 and 20 respectively include first and second shoes 24 and 26 respectively composed of a first rim 28 and a first web 30, and a second rim 32 and a second web 34. The first shoe assembly 18 has a first brake lining 36 secured to the rim 28. The second brake shoe assembly 20 has a second brake lining 38 secured to the rim 32. The outer surfaces of the linings 36 and 38 provide first and second lining friction surfaces 40 and 42 which mate with the drum friction surface 22 during brake actuation. The shoes 24 and 26 respectively have upper shoe ends 44 and 46 and lower shoe ends 48 and 50. The upper shoe ends 44 and 46 are arranged to be operatively engaged by a wheel cylinder 52 so that the shoe assemblies 18 and 20 may be hydraulically actuated for service brake operation.

As is well known in the art, a suitable service brake operator, such as a master cylinder (not shown), provides hydraulic brake fluid under pressure to the wheel cylinder 52 to expand the cylinder 52 and move the upper shoe ends 44 and 46 apart so that the linings 36 and 38 are moved into braking engagement with the drum friction surface 22. In the service brake mechanism 12 illustrated, the brake shoe assemblies 18 and 20 are arranged in a duo-servo manner. A link 54 between the lower shoe ends 48 and 50 transfers torque from the first shoe assembly 18 to the second shoe assembly 20. Torque from the brake shoe assemblies 18 and 20 is then transferred to an anchor pin 56 and finally to the backing plate 16.

The service brake mechanism 12 may also be of other well known types such as the leading-trailing, leading-leading and trailing-trailing. First and second brake shoe return springs 58 and 60 are connected to the corresponding brake shoes 24 and 26 near the wheel cylinder 52 so as to continually urge the upper shoe ends 44 and 46 toward a release position seen in FIG. 1. This arrangement is also well known in the art.

The parking brake mechanism 10 has an associated parking brake actuating lever 62, best seen in FIGS. 7, with an upper end 64 pivotally mounted on the web 34 of the second brake shoe 26 for selective pivoting between an apply position C and a release position B. The second web 34 is provided with an aperture 66 through which the lever's upper end 64, bent so as to extend through the aperture 66, extends to provide a pivoting attachment. A strut 68 disposed between the two shoe assemblies 18 and 20 near their upper ends 44 and 46 extends into a recess 70 in the lever 62.

The parking brake mechanism 10 is actuated by pulling on a lower end 72 of the lever 62 to pivot the lever 62 to the apply position C. This causes the strut 68 to be pressed against the first shoe assembly 18 with the first lining friction surface 40 engaging the drum friction surface 22.

The lower end 72 of the lever 62 is bent upward to form an upwardly open channel 74 with a first side 76 substantially longer than a second side 78. The channel 74 begins at an open first end 82 on a first edge 84 of the lever 62 and terminates at an open second end 86 on a second edge 87 of the lever 62. There is a ramp surface 88 on an uppermost edge of the second side 78 of the channel 74.

The ramp surface 88 tapers up from near a root 90 of the channel 74 at the first end 82 to a maximum height at the second end 86. The second end 86 of the channel 74 serves as an engagement surface. The second end 86 is recessed from the rest of the second edge 87 of the lever 62, providing a retaining surface 94 bordering a top edge of the second end 86. There is a notch 96 on the second edge 87 of the lever 62 above the retaining surface 94. A spring seat 98 projects out from the first edge 84 of the lever 62 at the first end 82 of the channel 74.

Figure 2:
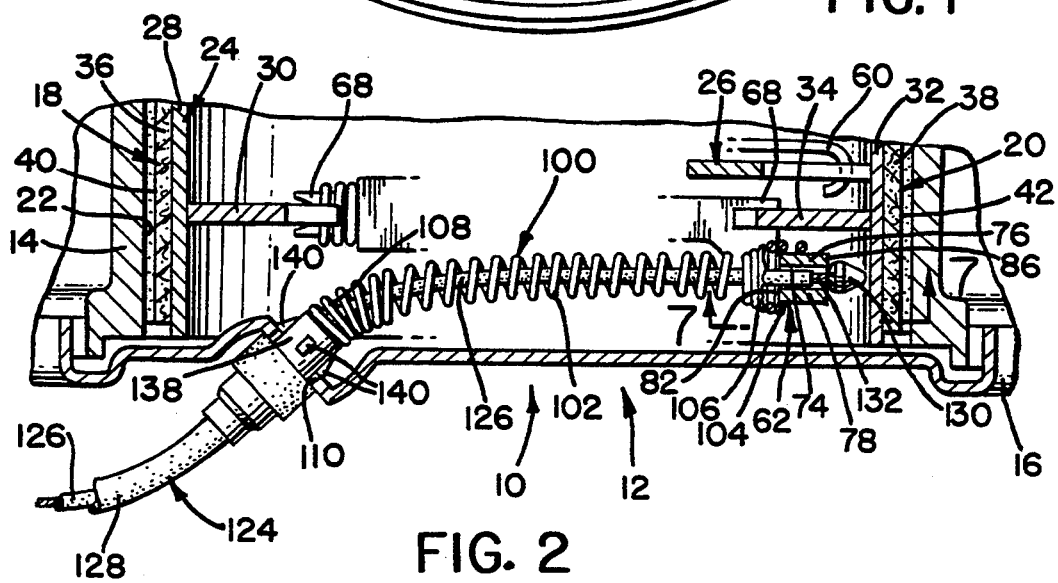
FIG. 2 shows a sectional view of the drum brake mechanism as it would be viewed from the direction of Arrows 2 of FIG. 1.

A lever return spring 100, best seen in FIGS. 1 and 2, is disposed between the lever 62 and the backing plate 16. A helically coiled section 102 of the spring has an end coil 104 at a first end 106 disposed on the spring seat 98 thereby engaging the lever 62 at the first end 82 of the channel 74 and partially enclosing the ramp surface 88. A second end 108 of the helically coiled section 102 of the spring extends through an opening 110 in the backing plate 16 before assembly is completed.

A hook section 112 of the spring 100 extends from the end coil 104, wrapping around the notch 96 in the lever 62, and thereby holding the end coil 104 in engagement with the lever 62. A restraining section 114 of the spring extends straight back from the hook section 112. A bending arm 116 of the restraining section 114 extends to a point proximate to the end coil 104. A straight length 117 of the restraining section 114 extends from the bending arm 116 in a direction away from the end coil 104 and proximate to the ramp surface 88 past an end of the ramp surface 88. The restraining section 114 then makes an upward loop 118 of 360 degrees.

A top 120 of the loop 118 is disposed between the bending arm 116 and the lever 62 and contacts the lever 62. Lastly, the restraining section 114 has a tail 122 which turns downward in a direction generally parallel with the second end 86 of the channel 74.

A cable assembly 124, best seen in FIG. 2, has a cable 126 slidably disposed in a flexible conduit 128. The cable 126 has a button 130 on a first end 132 substantially larger in diameter than the cable 126 allowing the cable 126 but not the button 130 to slidingly translate through the channel 74 of the lever 62. The button 130 is adapted to engage the lever 62 on the second end 86 of the channel 74. The cable 126, after the button 130 has engaged the lever 62, is used to selectively move the lever 62 to the apply position C by tensioning the cable 126.

The button 130 has a tapered tip 134. The button 130 also has a radiused end 136 opposite the tip 134. The end of the conduit 128 through which the cable 126 passes is a rigid bayonet 138 with barb-like tabs 140.

To install the cable assembly 124 in the parking brake mechanism 10, the first end 132 of the cable 126 is inserted into the second end 108 of the helically coiled section 102 of the spring 100 which extends through the opening 110 in the backing plate 16. The helically coiled section 102 of the spring 100 guides the first end 132 of the cable 126 to the lever 62 as it is fed into the enclosed parking brake mechanism 10. As the cable 126 is inserted, the button 130 travels freely through the helically coiled section 102 to where the button 130 exits the end coil 104. At approximately this point, the button 130 comes into contact with both the ramp surface 88 of the lever 62 and the loop 118 of the restraining section 114 of the spring 100 which resist further insertion of the button 130.

The button's tapered tip 134 facilitates progress along the ramp surface 88 by allowing the tip 134 to wedge itself under the loop 118 when the button 130 contacts the loop 118. As an insertion load on the cable 126 is increased, the force of the tip 134 against the loop 118 increases, forcing the loop 118 upward and outward, causing the bending arm 116 to deflect, thereby allowing further insertion of the button 130 along the ramp surface 88. As the button 130 is pushed past the loop 118, it is pressed against the ramp surface 88 by both the force of the bending arm 116 on the loop 118 and a bending load from the cable 126, both tending to direct the button 130 downward. FIGS. 5 and 6 show the button 130 partially up the ramp surface 88.

When the button 130 passes the end of the ramp surface 88, it has nothing to react against and is forced downward by the force of the bending arm 116 and the bending load from the cable 126. The button 130 immediately drops down and the cable 126 enters the channel 74. This loss of a reactive surface and subsequent dropping of the button 130 is immediately felt by a cable installer as a decrease in insertion load. The gradual increase in insertion load, followed by the relatively sudden decrease in insertion load, is perceived as a snapping action by the assembler, indicating that insertion of the cable 126 is complete. The cable 126 is then pulled on to confirm engagement with the second end 86 of the channel 74. FIG. 8 shows the button 130 engaged with the second end 86 of the channel 74.

The restraining section 114 radially traps the cable 126 after the button 130 has dropped off of the ramp surface 88. The restraining section 114, together with the lever 62, completely encircle the inserted cable 126. This prevents the cable 126 from sliding back down the ramp surface 88 or otherwise failing to engage the second end 86 of the channel 74 when the cable 126 is pulled. For example, if the cable 126 should be inserted more than necessary, the cable 126 may follow a surface inside the enclosure, arcing away from the channel 74, as shown in phantom in FIG. 1.

The loop 118 limits the upward movement of the cable 126 away from the channel 74. The tail 122 of the restraining section 114 prevents the cable 126 from deflecting laterally away from the lever 62, as might occur if the insertion load on the cable 126 were sufficient to cause it 126 to buckle. As the cable 126 is tensioned, the restraining section 114 serves to direct the button 130 into engagement with the second end 86 of the channel 74. By directing the button 130, the restraining section 114 facilitates the blind engagement of the cable 126 with the lever 62. The radiused back side 136 of the button 130 further facilitates engagement of the button 130 with the second end 86 of the channel 74 by preventing the button 130 from snagging on a surface or edge other than the channel's second end 86 when the cable 126 is tensioned.

After confirming engagement with the second end 86 of the channel 74, the conduit 128 is then pressed toward the spring 100. The bayonet 138 at the end of the conduit 128 contacts the second end 108 of the helically coiled section 102 of the spring 100, compressing the spring 100 as the bayonet 138 is moved toward the opening 110 in the backing plate 16. The bayonet 138 is forced into the opening 110. The barb-like tabs 140 engage the backing plate 16 when the bayonet 138 is fully inserted. With this engagement of the conduit 128 with the backing plate 16, installation of the cable assembly 124 is complete, leaving the helically coiled section 102 of the spring 100 functionally compressed between the lever 62 and the plate 16, which tends to move the lever 62 to the release position B. FIGS. 1 and 7 show the cable assembly completely installed.

The embodiments of the invention in which an exclusive property or privilege is claimed are defined as follows:

1. In a blind cable assembly having an enclosed mechanism;
   a lever arranged to actuate the enclosed mechanism;
   a cable having a button disposed on one end adapted to engage the lever, the button being substantially larger in diameter than the cable;
   a plate covering a part of the enclosed mechanism and the lever and having an opening through which the button and cable are inserted; and
   a lever return spring includes a helically coiled section disposed between the lever and the plate serving as a guide for the button and cable from the opening in the plate to the lever, wherein the improvement comprises:
   indicating and directing means, provided by the spring interacting with the lever, both for indicating complete insertion of the cable by a gradual increase in cable insertion load followed by a sudden decrease in cable insertion load and for directing the inserted button to an engagement surface of the lever as the cable is tensioned;
   means defining on the lever two sides forming an upwardly open channel, the channel beginning at a first end and terminating at a second end serving as the engagement surface;
   means defining a ramp surface on one of the sides of the channel;
   means defining on the lever a notch on a side common with the second end of the channel;
   means defining on the spring an end coil engaging the lever at the first end of the channel and partially enclosing the ramp surface;
   means defining on the spring a hook section extending from the end coil wrapping around the notch in the lever thereby holding the end coil in engagement with the lever; and
   means defining on the spring a cable restraining section extending from the hook section toward the end coil, then extending in a direction away from the end coil and proximate to the ramp surface and past an end of the ramp surface and bending to be generally parallel to the second end of the channel;
   whereby as the cable is inserted into the enclosed mechanism the button travels freely through the helically coiled spring section to where the button exits the end coil and contacts both the ramp surface and the restraining section which resist further insertion until a predetermined insertion load is exceeded causing the restraining section to deflect allowing further insertion of the button along the ramp surface with the insertion load rapidly dropping as the button passes the end of the ramp surface thereby indicating complete cable insertion and the restraining section trapping the cable thereby keeping the cable generally aligned with the cable after the cable has been fully inserted and directing the button into engagement with the second end of the channel as the cable is tensioned.

2. A blind cable assembly as claimed in claim 1, wherein the improvement further comprises:
   means defining on the button a tapered tip adapted to facilitate insertion of the button past the cable restraining section; and
   means defining on the button a radiused end opposite the tip adapted to facilitate engagement of the button with the second end of the channel when the cable is tensioned.

3. A parking brake assembly having a backing plate with an opening;
   a drum which together with the backing plate encloses a parking brake mechanism;
   first and second brake shoe assemblies mounted to the backing plate for selective engagement with the drum;

a parking brake lever pivoted on one of the shoes for selective pivoting between an apply position and a release position adapted to move at least one of the shoe assemblies into engagement with the drum in the apply position;

a cable having a button substantially larger in diameter than the cable disposed on one end adapted to engage the parking brake lever and being used to selectively move the parking brake lever to the apply position as the cable is tensioned;

a lever return spring tending to pivot the parking brake lever toward the released position; and cable guide means for guiding the first end of the cable from the opening in the backing plate to the lever thereby facilitating blind engagement of the cable with the lever, wherein the improvement comprises:

means both for indicating complete insertion of the first end of the cable by a gradual increase in cable insertion load followed by a sudden decrease in cable insertion load and for directing the inserted cable button to an engagement surface of the lever as the cable is tensioned;

wherein the lever return spring has a helically coiled spring section disposed between the plate and the lever and aligned with the opening in the plate and serving as the cable guide means;

wherein the indicating and directing means is provided by the spring interacting with the lever;

means defining on the lever two sides forming an upwardly open channel, the channel beginning at a first end and terminating at a second end which serves as the engagement surface;

means defining a ramp surface on one of the sides of the channel;

means defining on the lever a notch on a side common with the second end of the channel;

means defining on the spring an end coil engaging the lever at the first end of the channel and partially enclosing the ramp surface;

means defining on the spring a hook section extending from the end coil wrapping around the notch on the lever thereby holding the end coil in engagement with the lever; and means defining on the spring a cable restraining section extending from the hook section toward the end coil, then extending in a direction away from the end coil and proximate to the ramp surface and past an end of the ramp surface and bending to be generally parallel to the second end of the channel;

whereby as the cable is inserted into the enclosed mechanism the button travels freely through the helically coiled spring section to where the button exits the end coil and contacts both the ramp surface and the restraining section which resist further insertion until a predetermined insertion load is exceeded causing the restraining section to deflect allowing further insertion of the button along the ramp surface with the insertion load rapidly dropping as the button passes the end of the ramp surface thereby indicating complete cable insertion and the restraining section trapping the cable thereby keeping the cable generally aligned with the channel after the cable has been fully inserted and directing the button into engagement with the second end of the channel as the cable is tensioned.

4. A parking brake assembly as claimed in claim 3, wherein the improvement further comprises:

means defining on the button a tapered tip adapted to facilitate insertion of the button past the cable restraining section; and means defining on the button a radiused end opposite the tip adapted to facilitate engagement of the button with the second end of the channel when the cable is tensioned.

* * * * *